(12) United States Patent
Kaiser et al.

(10) Patent No.: US 8,487,502 B2
(45) Date of Patent: Jul. 16, 2013

(54) SEGMENTED STATOR CORE

(75) Inventors: Edward L. Kaiser, Orion, MN (US);
Peter J. Savagian, Bloomfield Hills, MI
(US); Peter Bostwick, Rochester, MI
(US)

(73) Assignee: GM Global Technology Operations LLC, Detroit, MI (US)

( * ) Notice: Subject to any disclaimer, the term of this patent is extended or adjusted under 35 U.S.C. 154(b) by 105 days.

(21) Appl. No.: 13/173,054

(22) Filed: Jun. 30, 2011

(65) Prior Publication Data

US 2013/0002086 A1    Jan. 3, 2013

(51) Int. Cl.
*H02K 1/00* (2006.01)
*H02K 1/28* (2006.01)

(52) U.S. Cl.
USPC ...... 310/216.009; 310/216.004; 310/216.007; 310/216.008; 310/216.049

(58) Field of Classification Search
USPC .................... 310/216.001–216.113
See application file for complete search history.

(56) References Cited

U.S. PATENT DOCUMENTS

| | | | |
|---|---|---|---|
| 4,494,030 A * | 1/1985 | Mulach et al. | 310/256 |
| 6,634,080 B2 * | 10/2003 | Bareis et al. | 29/596 |
| 7,821,175 B2 * | 10/2010 | Ionel et al. | 310/216.009 |
| 2006/0279160 A1 * | 12/2006 | Yoshinaga et al. | 310/216 |
| 2009/0085415 A1 * | 4/2009 | Ionel et al. | 310/43 |

* cited by examiner

*Primary Examiner* — Tran Nguyen
*Assistant Examiner* — Leda Pham
(74) *Attorney, Agent, or Firm* — Quinn Law Group, PLLC

(57) ABSTRACT

A stator core includes a first lamination and a second lamination. The first lamination is formed from a plurality of first segments and has a plurality of first mounting ears. The second lamination is formed from a plurality of second segments and has a plurality of second mounting ears. The first lamination and the second lamination are aligned with a common axis and are rotated about the common axis such that the first lamination is not aligned with the second lamination.

12 Claims, 3 Drawing Sheets

SEGMENTED STATOR CORE

TECHNICAL FIELD

This disclosure relates to electric machines and, more specifically, to stators for electric machines.

BACKGROUND

An electric motor uses electric potential energy to produce mechanical energy through the interaction of magnetic fields and current-carrying conductors. The reverse process, using mechanical energy to produce electrical energy, is accomplished by a generator or dynamo. Other electric machines, such as motor/generators, combine various features of both motors and generators.

Electric machines may include an element rotatable about a central axis. The rotatable element, which may be referred to as a rotor, may be coaxial with a static element, which may be referred to as a stator. The electric machine uses relative rotation between the rotor and stator to produce mechanical energy or electrical energy.

SUMMARY

A stator core is provided. The stator core includes a first lamination and a second lamination. The first lamination is formed from a plurality of first segments and has a plurality of first mounting ears. The second lamination is formed from a plurality of second segments and has a plurality of second mounting ears. The first lamination and the second lamination are aligned with a common axis and are rotated about the common axis relative to each other. The angle of rotation of the first lamination relative to the second lamination is not orthogonal, such that the relative angle between the first lamination and second lamination is not ninety degrees.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
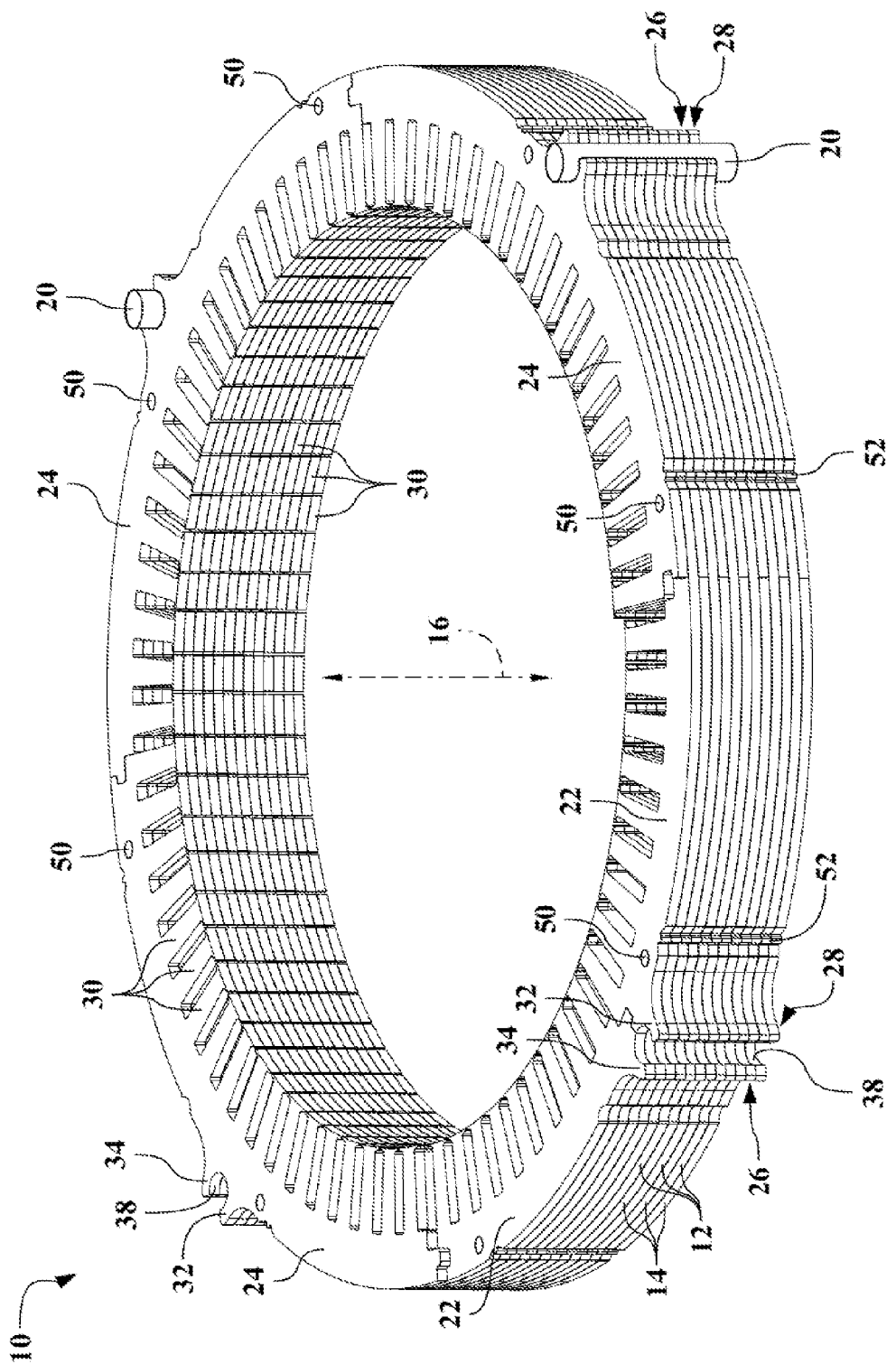
FIG. 1 is a schematic, isometric view of a stator core formed from layers having four segments per layer.
Figure 2:
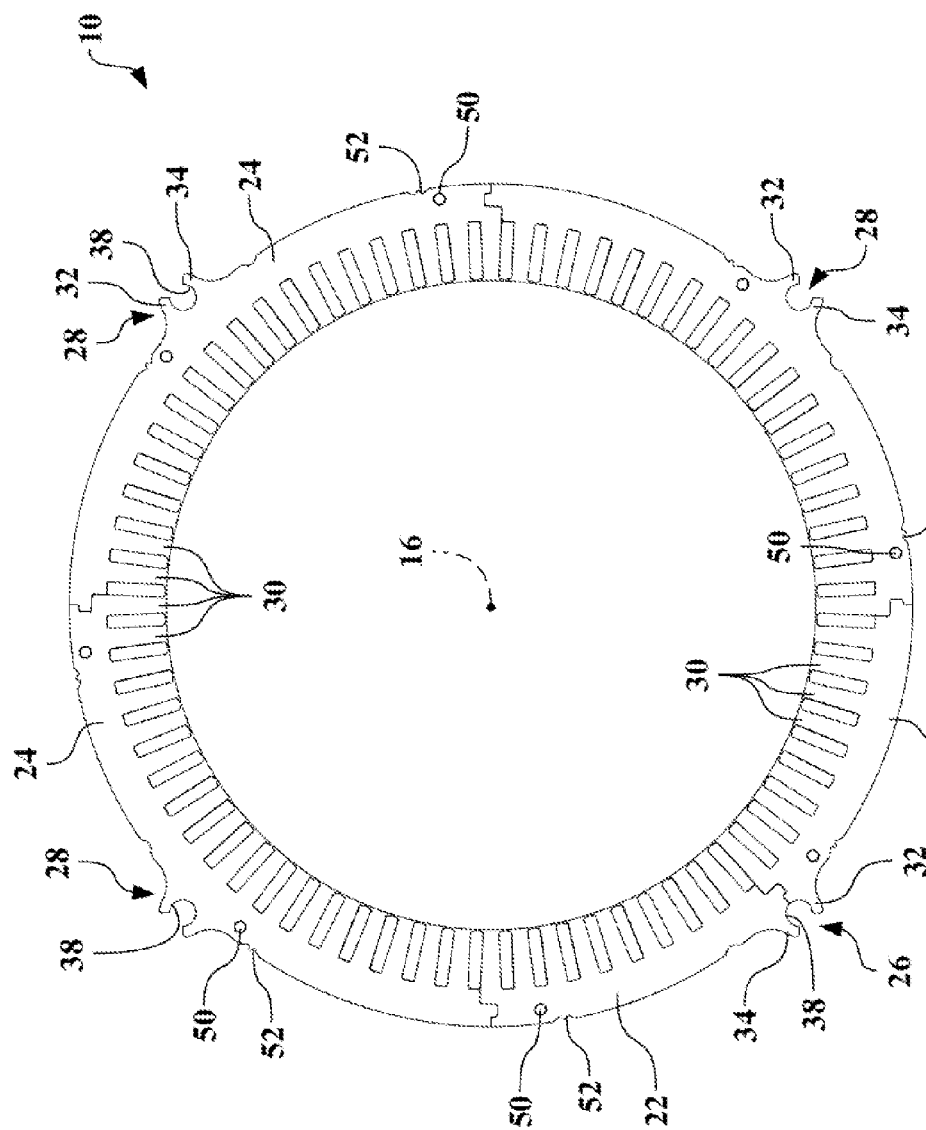
FIG. 2 is a schematic, top view of the stator core shown in FIG. 1.

Referring to the drawings, wherein like reference numbers correspond to like or similar components whenever possible throughout the several figures, there is shown in FIG. 1 and FIG. 2 two schematic views of a stator core 10. FIG. 1 shows an isometric view of the stator core 10 and FIG. 2 shows a top view. Features and components shown in other figures may be incorporated and used with those shown in FIGS. 1-2.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The stator core 10 is shown partially assembled in FIGS. 1-2, and may be used to construct a stator (not shown). The stator core 10 may be one component of an electric machine (not shown), such as an electric motor, generator, or motor/generator.

The stator core 10 includes one or more first layers or first laminations 12 and one or more second layers or second laminations 14. The first laminations 12 and second laminations 14 are arranged or stacked in alternating layers to form the stator core 10 shown in FIGS. 1-2. The first laminations 12 and the second laminations 14 are aligned with a common axis 16, and are rotated relative to each other about the common axis 16 such that the first laminations 12 are offset relative to the adjacent or adjoining second laminations 14, such that a bricklayer type pattern is formed. The angle of rotation between adjacent first laminations 12 and second laminations 14 is not orthogonal (i.e., is not ninety degrees).

In the stator core 10 shown in FIGS. 1-2, the first laminations 12 are rotated by approximately forty-five degrees about the central axis 16 relative to the second laminations 14. However, the first laminations 12 may be rotated about the common axis 16 by other relative orientations, such as approximately forty to fifty degrees or thirty to sixty degrees relative to the second laminations 14.

The stator core 10 is configured to interface with one or more locating features 20. The locating features 20 may mate or attach to a housing or support (not shown) of the electric machine into which the stator core 10 is incorporated, or the locating features 20 may be incorporated into the housing. Alternatively, the locating features 20 may be configured to attach to a transmission housing (not shown) when the stator core 10 is part of a transmission or hybrid transmission (not shown). The locating features 20 are shown only schematically to illustrate the location relative to the first laminations 12 and the second laminations 14. The locating features 20 may be, for example and without limitation: pins, dowels, bosses extending from the surrounding component, or fasteners.

The first laminations 12 are formed from a plurality of first segments 22, and the second laminations 14 are formed from a plurality of second segments 24. The first segments 22 cooperate to define the first laminations 12 as individual layers of the stator core 10, and the second segments 24 cooperate to define the second laminations 14 as individual layers of the stator core 10. Therefore, each first lamination 12 and second lamination 14 may actually be viewed as defined by a single layer of the first segments 22 and the second segments 24, respectively.

The first lamination 12 and the second lamination 14 shown are formed from four of the first segments 22 and four of the second segments 24, respectively. However, other numbers of segments may be used to create the layers of the stator core 10.

Because the angle of rotation between adjacent first laminations 12 and second laminations 14 is not orthogonal, the interfaces or joints between the first segments 22 and also the second segments 24 are not stacked over each other. Therefore, a bricklayer type pattern is formed by the first segments 22 and the second segments 24. When viewed from the side or an isometric view (as in FIG. 1) the joint lines between first segments 22 or second segments 24 are alternating every other layer.

The first segments 22 have a plurality of first mounting ears 26, and the second segments 24 have a plurality of second mounting ears 28. The first mounting ears 26 and the second mounting ears 28 are configured to mate or interface with the locating features. The second segments 24 have the second mounting ears 28 formed centrally by each of the second segments 24. However, for the first segments 22, the first mounting ears 26 are formed of the ends by two adjacent first segments 22. In the stator core 10 shown in FIG. 1, the number of first mounting ears 26 and second mounting ears 28 per layer matches the number of segments per layer. However, the differing combinations of ears and segments may be used to form the stator core 10.

A plurality of stator teeth 30 may be used to support and align stator windings (not shown) in winding slots formed between the stator teeth 30. The stator windings are conductive wires or cables through which current may flow during operation of the electric machine.

The stator core 10 shown in FIGS. 1-2 has the stator teeth 30 on the interior, toward the common axis 16, while the first mounting ears 26 and the second mounting ears 28 are on the exterior, such that the stator core 10 will cooperate with an interior rotor (not shown). However, the elements and components described herein and illustrated with respect to the stator core 10 may also be used to construct an electric machine having an exterior rotor and interior stator, such that the stator teeth 30 may be located on the exterior of the stator core 10 and the first mounting ears 26 and second mounting ears 28 located on the interior of the stator core 10.

In the views shown in both FIG. 1 and FIG. 2, the stator core 10 is missing one of the second segments 24 from the top-most (as viewed in FIG. 1) second lamination 14. Therefore, the first segments 22 forming one of the first laminations 12, just below the top layer, are viewable in FIGS. 1-2.

Figure 3B:
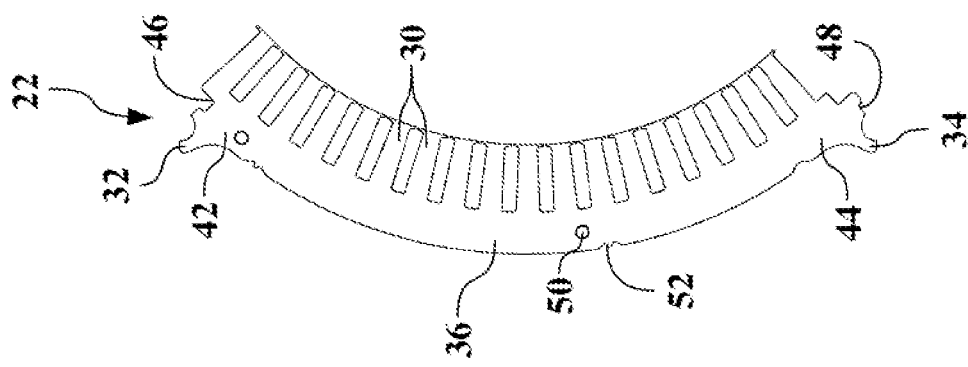
FIG. 3B is a schematic, top view of one of the first segments which may be used to construct the stator core shown in FIGS. 1-2, or stator cores similar thereto.
Figure 3A:
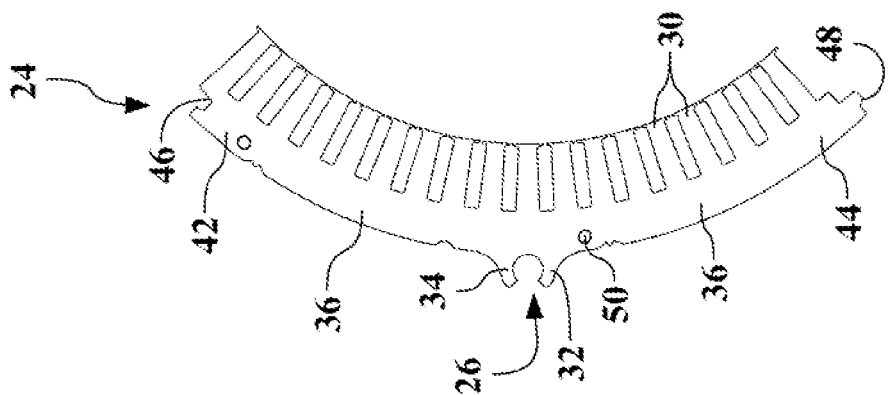
FIG. 3A is a schematic, top view of one of the second segments which may be used to construct the stator core shown in FIGS. 1-2, or stator cores similar thereto.

Referring now to FIG. 3A and FIG. 3B, and with continued reference to FIGS. 1-2, there are shown top views of one of the second segments 24 and one of the first segments 22. As shown in FIGS. 1-2, the first segments 22 and the second segments 24 may be used to construct or assemble the stator core 10 shown in FIGS. 1-2 or other stator configurations. Features and components shown in other figures may be incorporated and used with those shown in FIG. 3A and FIG. 3B.

Each of the first segments 22 and second segments 24 includes several common features. However, the first segments 22 and the second segments 24 are not identical and are configured to allow the first laminations 12 and the second laminations 14 to be rotated or offset relative to each other.

A first mounting tab 32 and a second mounting tab 34 extend from a body 36. The stator teeth 30 extend from the body 36 opposite the first mounting tab 32 and the second mounting tab 34. The body 36 provides linking structure for the features of the first segments 22 and the second segments 24 and will carry loads between the stator teeth 30 and the mounting ears 26, 28.

The first mounting tab 32 and second mounting tab 34 cooperate to form the first mounting ears 26 and the second mounting ears 28. The first mounting tab 32 and second mounting tab 34 also cooperate to define a mounting slot 38 (which may be better viewed in FIGS. 1-2). The mounting slot 38 is shaped or configured to mate with one of the locating features 20, and is closed proximal to the body 36 and open distal to the body 36. Therefore, the first mounting tab 32 and the second mounting tab 34 do not fully surround the locating feature 20 mated therewith, and the opening of the mounting slot 38 is facing away from the body 36. The opening of the mounting slot 38 is also open outward from the assembled stator core 10.

Each of the first segments 22 and the second segments 24 also includes a first end 42 of the body 36 (generally, toward the top of FIG. 3A and FIG. 3B) and a second end 44 of the body 36 (generally, toward the bottom of FIG. 3A and FIG. 3B). The first ends 42 have a first joint 46 and the second ends 44 have a second joint 48. During assembly of the stator core 10, or of the individual first laminations 12 or second laminations 14, the second joint 48 is mated with the first joint 46.

Figure 4:
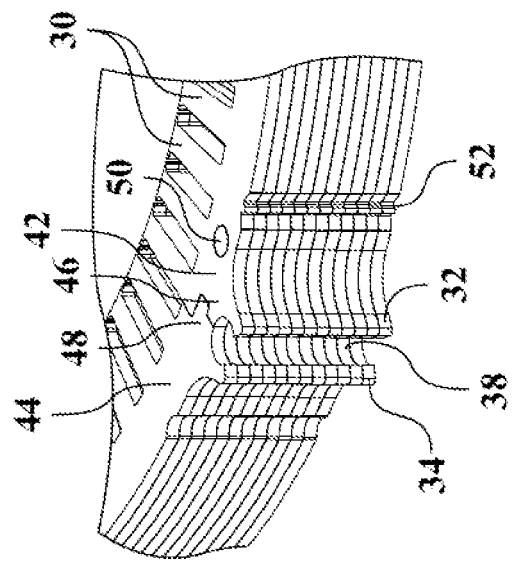
FIG. 4 is a schematic, isometric close-up view of a joint region between stator segments, such those shown in FIGS. 1-3B.

Referring also to FIG. 4, and with continued reference to FIGS. 1-3B, there is shown a schematic, isometric view of the interface between adjacent first segments 22 or second segments 24. Note that while the view shown in FIG. 4 includes only the joint between first segments 22, the interface is representative of either the first segments 22 of the first laminations 12 or the second segments 24 of the second laminations 14. Features and components shown in other figures may be incorporated and used with those shown in FIG. 4.

As shown in FIG. 4, and also viewable in FIGS. 1-2, the first joint 46 on the first end 42 interlocks or mates with the second joint 48 on the second end 44. The second joint 48 of the second end 44 substantially overlaps one of the stator teeth 30 on the first end 42 of the adjacent first segment 22 or second segment 24.

As shown in FIGS. 1-3B, the first mounting tab 32 of the first segments 22 is located on the first end 42 adjacent the first joint 46, and the second mounting tab 34 of the first segments 22 is located on the second end 44 adjacent the second joint 48. Therefore, the first mounting ears 26 of the first laminations 12 are formed adjacent to the first joint 46 and the second joint 48, such that the first mounting ears 26 are assembled from a pair of the first segments 22. The first joint 46 and the second joint 48 generally bisect the first mounting ears 26.

The first mounting ears 26 are formed by the first mounting tab 32 and the second mounting tab 34 on adjacent ends of two of the first segments 22. However, the second mounting ears 28 of the second laminations 14 are not located on the same portion of the second segments 24.

The first mounting tab 32 of the second segments 24 is located between the first end 42 and the second end 44, and the second mounting tab 34 of the second segments 24 is located between the first end 42 and the second end 44. Therefore, the second mounting ears 28 are located between the first end 42 and the second end 44, and are formed on individual second segments 24. In the configuration of the stator core 10 shown in FIGS. 1-2, the second mounting ears 28 are located substantially equidistant from the first end 42 and the second end 44 of the second segments 24.

As shown in FIGS. 1-2, the first laminations 12 are rotated approximately forty-five degrees relative to the second laminations 14. Therefore, the first mounting ears 26 of the first laminations 12 are aligned with the second mounting ears 28 of the second laminations 14. The first mounting ears 26 and the second mounting ears 28 cooperate to further define the mounting slots 38.

As shown in FIGS. 1-2, the first laminations 12 and the second laminations 14 include features configured to assist in assembly of the first laminations 12 and the second laminations 14 into the final stator core 10. While two different assembly features are shown, additional features may be incorporated or only one feature may be used.

Each of the first segments 22 and the second segments 24 includes a plurality of interlocks 50. The plurality of interlocks 50 are configured with some form of male and female features that help interlock or create friction between adjacent first laminations 12 and the second laminations 14. In the stator core 10 shown in FIGS. 1-2 the female portion of the interlocks are viewable, and the male portion of the interlocks 50 are on the opposing side of the first segments 22 and the second segments 24 and extend into the female portions shown. The same pattern of the plurality of interlocks 50 are repeated on the first segments 22 and the second segments 24 such that first laminations 12 may be rotated relative to the second laminations 14 without altering the interlocks 50.

Each of the first segments 22 and the second segments 24 further includes a plurality of weld channels 52. The plurality of weld channels 52 assist in welding the first laminations 12 and the second laminations 14 to maintain the stacked configuration of the stator core 10 shown.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A stator core, comprising:
   a first lamination formed from a plurality of first segments, and having a plurality of first mounting ears;
   a second lamination formed from a plurality of second segments, and having a plurality of second mounting ears, wherein the first lamination and the second lamination are aligned with a common axis and are rotated about the common axis such that the first lamination is not angularly orthogonal relative to the second lamination;
   wherein each of the first segments and the second segments further includes:
      a body;
      a first mounting tab extending from the body;
      a second mounting tab extending from the body, wherein the first mounting tab and second mounting tab cooperate to form the first and second mounting ears and cooperate to define a mounting slot, which is closed proximal to the body and open distal to the body;
      a first end having a first joint;
      a second end having a second joint, wherein the second joint is configured to mate with the first joint;
      a plurality of teeth extending from the body opposite the first mounting tab and the second mounting tab;
   wherein the first mounting tab of the first segments is located on the first end adjacent the first joint;
   wherein the second mounting tab of the first segments is located on the second end adjacent the second joint, such that the first mounting ears are formed adjacent to the first joint and the second joint; and
   wherein the mounting slot is configured to interface with a locating feature, and wherein the first mounting tab and the second mounting tab do not fully surround the locating feature.

2. The stator core of claim 1,
   wherein the first mounting tab of the second segments is located between the first end and the second end; and
   wherein the second mounting tab of the second segments is located between the first end and the second end, such that the second mounting ears are located between the first end and the second end.

3. The stator core of claim 2, wherein the second mounting ears are located substantially equidistant from the first end and the second end of the second segments.

4. The stator core of claim 3, wherein the first joint of the first end substantially overlaps one of the teeth on the second end.

5. The stator core of claim 4, wherein the second lamination is rotated about the common axis by approximately forty to fifty degrees relative to the first lamination.

6. The stator core of claim 5, wherein each of the first segments and the second segments further includes:
   a plurality of male interlocks; and
   a plurality of female interlocks configured to mate with the male interlocks.

7. The stator core of claim 5, wherein each of the first segments and the second segments further includes a plurality of weld channels.

8. A stator core, comprising:
   a plurality of first laminations formed from a plurality of first segments having a plurality of first mounting ears;
   a plurality of second laminations formed from a plurality of second segments having a plurality of second mounting ears;
   wherein the first mounting ears and the second mounting ears define a plurality of mounting slots, which are closed proximal to the first segments and the second segments and open distal to the first segments and the second segments;
   wherein the mounting slots defined by the first mounting ears of the first segments are located at a joint between adjacent first segments; and
   wherein the first laminations and the second laminations are aligned with a common axis and are rotated about the common axis such that the first laminations are angularly offset relative to the second laminations.

9. The stator core of claim 8, wherein the mounting slots are configured to interface with a plurality of locating features, and wherein the mounting slots do not fully surround the locating features.

10. The stator core of claim 9, wherein each of the first segments and the second segments further includes:
    a first end having a first joint; and
    a second end having a second joint, wherein the second joint is configured to mate with the first joint.

11. The stator core of claim 10, wherein each of the first segments and the second segments further includes:
    a body;
    a first mounting tab extending from the body;
    a second mounting tab extending from the body, wherein the first mounting tab and second mounting tab cooperate to form the first and second mounting ears; and
    a plurality of teeth extending from the body opposite the first mounting tab and the second mounting tab.

12. The stator core of claim 11,
    wherein the first mounting tab of the second segments is located between the first end and the second end; and
    wherein the second mounting tab of the second segments is located between the first end and the second end, such that the second mounting ears are located between the first end and the second end.

* * * * *